United States Patent
Baumann et al.

(10) Patent No.: US 8,788,184 B2
(45) Date of Patent: Jul. 22, 2014

(54) METHOD AND APPARATUS FOR THE SELF-DIAGNOSIS OF AN EXHAUST GAS PROBE

(75) Inventors: Thomas Baumann, Kornwestheim (DE); Enno Baars, Leonberg (DE); Johannes Grabis, Renningen (DE); Benjamin Hagemann, Gerlingen (DE); Bernhard Kamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 730 days.

(21) Appl. No.: 13/089,770

(22) Filed: Apr. 19, 2011

(65) Prior Publication Data
US 2011/0252768 A1 Oct. 20, 2011

(30) Foreign Application Priority Data

Apr. 20, 2010 (DE) .......................... 10 2010 027 975

(51) Int. Cl.
*F01N 9/00* (2006.01)
*F01M 11/00* (2006.01)
*F02D 41/14* (2006.01)

(52) U.S. Cl.
USPC .......................................... 701/114; 123/697

(58) Field of Classification Search
USPC .......... 701/114, 109, 108; 123/673, 674, 697, 123/479; 73/114.61, 114.69, 114.71
See application file for complete search history.

(56) References Cited

U.S. PATENT DOCUMENTS

| | | | | |
|---|---|---|---|---|
| 5,090,387 A | * | 2/1992 | Mayer et al. | 123/697 |
| 5,285,762 A | * | 2/1994 | Werner et al. | 123/697 |
| 7,832,254 B2 | | 11/2010 | Guenschel et al. | |
| 8,103,430 B2 | * | 1/2012 | Aliakbarzadeh | 701/109 |

FOREIGN PATENT DOCUMENTS

| | | |
|---|---|---|
| EP | 1925926 A1 | 5/2008 |
| WO | 03/006976 A2 | 1/2003 |

* cited by examiner

*Primary Examiner* — Hieu T Vo
(74) *Attorney, Agent, or Firm* — Michael Best & Friedrich LLP

(57) ABSTRACT

A method for the self-diagnosis of an exhaust gas probe (20). The exhaust gas probe (20) has at least one heating element (26). The method includes a modeled heat output PH is determined for the heating element (26) by means of a computer program comparing parameters of the gas stream with a measured heat output, and determining, when the parameters of the gas stream exceeds the measured heat output by more than a defined tolerance limit, that one of the exhaust gas probe (20) is defective, and an exhaust gas section (17) in which the exhaust gas probe (20) is installed is faulty.

20 Claims, 1 Drawing Sheet

METHOD AND APPARATUS FOR THE SELF-DIAGNOSIS OF AN EXHAUST GAS PROBE

BACKGROUND OF THE INVENTION

The invention relates to a method for the self-diagnosis of an exhaust gas probe, the exhaust gas probe having at least one heating element.

Furthermore, the invention relates to an apparatus for the self-diagnosis of a corresponding exhaust gas probe, the exhaust gas probe being connected to an engine controller or a sensor control unit, and the engine controller or the sensor control unit having devices for the diagnosis of the exhaust gas probe.

Particle sensors are used nowadays, for example, for monitoring the soot emission of internal combustion engines and for on board diagnosis (OBD), for example functionally monitoring particle filters. Here, collecting, resistive particle sensors (particle mass sensors or PM sensors) are known which evaluate a change in the electric properties of an interdigital electrode structure on account of particle accretions. Two or more electrodes can be provided which preferably engage into one another in the manner of a comb. The electrodes are short circuited as a result of a rising number of particles accreting on the particle sensor, which results in an electric resistance which decreases as the particle accretion increases, a decreasing impedance or in a change in a characteristic variable which is linked to the resistance or the impedance, such as a voltage and/or a current. For evaluation, generally a threshold value, for example of a measuring current between the electrodes, is fixed and the time until the threshold value is reached is used as a measure of the accreted particle quantity. As an alternative, a signal change speed during the particle accretion can also be evaluated. If the particle sensor is fully loaded, the accreted particles are burned in a regeneration phase with the aid of a heating element which is integrated into the particle sensor.

DE 101 33 384 A1 describes a resistive particle sensor of this type. The particle sensor is constructed from two comb-like electrodes which engage into one another and are covered at least partially by a trapping sleeve. If particles from a gas stream accrete on the particle sensor, this leads to a change in the impedance of the particle sensor, which change can be evaluated and from which the amount of accreted particles and therefore the amount of particles entrained in the exhaust gas can be deduced.

DE 10 2005 015103 A1 describes one special embodiment of a particle sensor of this type, in which embodiment the actual soot sensor is surrounded with a metallic housing for protection. Inter alia, one embodiment is described, in which the soot sensor is arranged in a protective tube which surrounds it or, as an alternative, a double protective tube which has one or more inlet openings for the gas stream.

In order to regenerate the particle sensor after particle accretion has taken place, the sensor element has to be burned free with the aid of an integrated heating element. This has to be carried out at defined time intervals, in order to avoid corruptions of the particle concentration determination.

For the self-diagnosis, there is provision, for example, in a further application of the applicant with the internal reference R.318399 for the particle sensor to have an additional flat test electrode, and for different test voltages to be applied between the measuring electrodes and the test electrode in a plurality of method steps, and for in each case a current or a capacitance to be measured and for correct functioning of the particle sensor to be deduced using the determined values.

EP 1 925 926 A1 describes an apparatus and an evaluation method for testing the functionality and for carrying out a plausibility check of a sensor which is based on an electrode system, in particular of a particle sensor, the apparatus comprising at least one reference electrode system. Here, the evaluation method provides comparative measurements at the measuring electrodes and at the reference electrodes, correct functioning of the sensor being deduced using the determined values.

Since the particle sensor is arranged downstream in the exhaust gas stream with regard to a particle filter if used for on board diagnosis, no more particles, in particular soot particles, which could supply a corresponding sensor signal, should be situated in the exhaust gas in the case of a fully functional particle filter at that point, at which the particle sensor is arranged. However, the fact that no signal is supplied by a sensor can also mean that the particle sensor is defective and therefore a possibly likewise defective particle filter is not detected as being defective. In addition, sooting of the protective tube can also lead to a faulty interpretation of the signals.

SUMMARY OF THE INVENTION

It is therefore an object of the invention to provide a method which leads to improved self-diagnosis of an exhaust gas probe, in particular of a particle sensor.

Furthermore, it is an object of the invention to provide a corresponding apparatus for carrying out the method.

The object which relates to the apparatus is achieved by the fact that the engine controller or the sensor control unit has at least one calculating unit for the determination in a modeled manner of a parameter which denotes the correct operation of the exhaust gas probe, it being possible for this parameter to be determined from boundary conditions for the gas stream or from measured parameters for the gas stream, and it being possible for said parameter to be compared with a measured parameter by means of at least one evaluation unit which is integrated into the engine controller or into the sensor control unit, and it being possible for a defect of the exhaust gas probe to be derived from a deviation which exceeds a defined tolerance limit or it being possible for a faulty condition to be detected in an exhaust gas section, in which the exhaust gas probe is installed. Here, in one preferred design variant, the parameter which is defined in a modeled manner and is compared with the measured parameter with regard to the self-diagnosis is the heat output $P_H$ of the heating element of the exhaust gas probe.

Here, the method according to the invention provides for a modeled heat output $P_H$ or a value which represents the modeled heat output $P_H$ to be determined for the heating element by means of a computing program from boundary conditions for the gas stream or from measured parameters for the gas stream, and to be compared with a measured heat output or with a value which represents the measured heat output $P_H$, and in the case of a deviation which exceeds a defined tolerance limit, for a defect of the exhaust gas probe to be deduced or a faulty condition in an exhaust gas section, in which the exhaust gas probe is installed, to be concluded. There can be provision here for the deviation to be evaluated with respect to defined limit values or for the absolute value to be evaluated in relation to a fixed threshold or a threshold value.

One preferred method variant and one preferred apparatus variant provide here for a particle sensor for determining a particle content in the gas stream to be used as exhaust gas probe or the exhaust gas probe to be configured as a particle sensor, the particle sensor being heated by means of the heating element in a regeneration phase and a soot loading on the particle sensor being removed in the process.

As a result of self-diagnosis of this type, it is possible, for example, to detect defective particle sensors, the electrodes of which have been damaged during the production or in use over the service life of the sensor, and to inform the driver/operator of the vehicle/system by way of visual and/or acoustic warnings if the sensor has failed totally. One preferred use of the method and of its variants, as will be described in the following text, provides the regeneration of the particle sensor in the context of on board diagnosis in a diesel internal combustion engine. In this application, what is important is, in particular, precise and reproducible diagnosis of the particle loading of a soot particle filter (diesel particulate filter, DPF) which is arranged in the exhaust gas section of the diesel internal combustion engine. This is advantageous, in particular, in particle sensors which, as viewed in the flow direction of the exhaust gas, are installed downstream of a particle filter, and it is unclear here whether the particle sensor functions correctly and the exhaust gas only has a low soot proportion to none at all or whether the particle sensor is faulty and the exhaust gas is possibly heavily loaded with soot, however. Furthermore, blockages in the protective tube or even deliberate removal of the particle filter can be diagnosed. Faulty measurements can likewise be detected as such and either a corresponding correction of the measured data can be performed or, for example, an exchange of the sensor can be initiated. Considerably improved operational reliability in comparison with the prior art can therefore be achieved.

The method according to the invention utilizes the fact that the typically prevailing conditions in the exhaust gas section which are generally dependent on the operating point, such as temperature, pressure and volumetric flow, are known, and a prognosis about the actual sensor temperature and therefore about the heat output $P_H$ which is to be expected or is required can be produced herefrom, in a modeled manner from an inflow into the protective tube which surrounds the particle sensor and from the thermal coupling to the sensor element in the particle sensor. This relates both to an unheated sensor (purely passive incident flow) and to a heated sensor, the temperature response of which is then not only dependent on the surrounding conditions, but rather, in particular, also on the inherent heating. In principle, this method can also be used in other exhaust gas probes with a heating device.

There is provision in one method variant for the measured heat output $P_H$ to be determined directly from a heating current $I_H$ and a heating voltage $U_H$ applied to the heating element in accordance with $P_H = U_H * I_H$ or from their effective values, which is advantageous in the case of pulse width modulated supply voltages, or for the measured heat output $P_H$ to be determined from a replacement variable.

If the heating current $I_H$ cannot be determined or can be determined only with increased outlay, the heating voltage $U_H$ can be used as replacement variable in one advantageous method variant.

There is provision in another method variant for a heat output which can be provided to be used as replacement variable, which heat output is determined from an available supply voltage $U_{Bat}$ (battery voltage) and a maximum possible heating duty factor $TV_{max}$.

In particular in the case of diagnoses which are intended to detect a defect of the heating element, it can be advantageous if, in a first diagnosis step, a temperature measuring device which is usually configured as a separate temperature dependent resistance element is used in the exhaust gas probe to detect directly whether a setpoint temperature to be reached has been reached, and it is determined in a second diagnosis step whether, if this is the case, a deviation has been caused as a consequence of unfavorable operating conditions. Deviations of this type can be, for example, an excessively high exhaust gas speed or an excessively low supply voltage. If deviations of this type are not detected, a defect in the heating element has to be assumed, which can then be reported as a defect to a superordinate control unit, for example to the engine controller.

There can be provision in one method variant for further variables which go beyond the heat output $P_H$ determined in a modeled manner to be determined in a modeled manner and to be used for a comparison. This can be, in particular, a modeled temperature which is determined from the heat output $P_H$ determined in a modeled manner and is compared with a measured temperature. Furthermore, a comparison is also possible of an exhaust gas speed which is calculated from the heat output $P_H$ with an exhaust gas speed which is determined by the engine controller, based on a signal of an air mass flow rate sensor which is installed within the air induction means of the internal combustion engine.

Since the sensor element of an exhaust gas probe, for example of a particle filter, has a thermal inertia, delays will occur between the occurrence of changes in the input variables, such as heat output, exhaust gas speed, exhaust gas temperature, etc., and the occurrence of changes resulting therefrom in the output variables, such as the sensor element temperature for example. This has to be taken into consideration correspondingly in the model formation or in the diagnosis applications. There is therefore provision in one preferred method variant for input variables for the measured parameters for the gas stream to be subjected first of all to a filtering operation and to be subsequently processed further for determining the modeled heat output. Above all, the use of a 1st order low pass filter is possible here.

There can be provision in a further method variant for temporal changes of the variables which are determined in a modeled manner to be compared, instead of the absolute values, with the measured variables or their changes and to be evaluated. It can be favorable, in particular, here to observe changes in a relatively short time period. This can be advantageous if it is known that certain disturbance variables are variable only over longer time periods than those considered. In this case, said disruption variables could be assumed to be constant. Thus, for example, the temperature of the exhaust gas and exhaust gas pipe of an internal combustion engine can be considered to be variable only relatively slowly if the installation location of the particle sensor is situated relatively far to the back, in particular behind the particle filter of the exhaust gas purification system in the exhaust gas section.

One method variant provides, during the evaluation, for an observed change in the heat output to be compared with a change in the measured or calculated parameters for the gas stream, the ratio of change in the heat output and change in the measured or calculated parameters for the gas stream being compared with a predefined threshold value or a variable threshold value which is a function of the parameter or the parameters which defines/define the gas stream. A dynamic adaptation of the evaluation can therefore be realized, it being possible for different threshold values to be calculated, for example, in different operating states, which results in a more precise diagnosis function. For example, the change in the heat output $P_H$ which is defined via the heating voltage $U_H$ can be compared with the change in the exhaust gas speed, it being possible for the ratio to be compared with a threshold value which is a function of the exhaust gas speed or the change therein. This threshold value can be stored in the sensor control unit, for example, as a function of the exhaust gas speed or the change therein in the form of a characteristic curve.

It is advantageous with regard to a simple evaluation if the diagnosis is carried out during a phase at a constantly controlled temperature or during the regeneration of the exhaust gas probe which is configured as a particle sensor during a heating ramp for achieving a free burning temperature required for soot elimination or in the case of deviations of the measured actual temperature from the expected temperature setpoint value.

One application of the method, as it has been described in the preceding text with its method variants, envisages the use for alternative diagnosis uses, another parameter which denotes the correct operation of the exhaust gas probe being determined in a modeled manner and being compared with a measured value for this parameter instead of a comparison of the modeled heat output $P_H$ with a value which represents the measured heat output $P_H$. A parameter of this type can be the heating resistance $R_H$, for example.

BRIEF DESCRIPTION OF THE DRAWINGS

In the following text, the invention will be explained in greater detail using one exemplary embodiment which is shown in the figures, in which.

DETAILED DESCRIPTION

Figure 1:
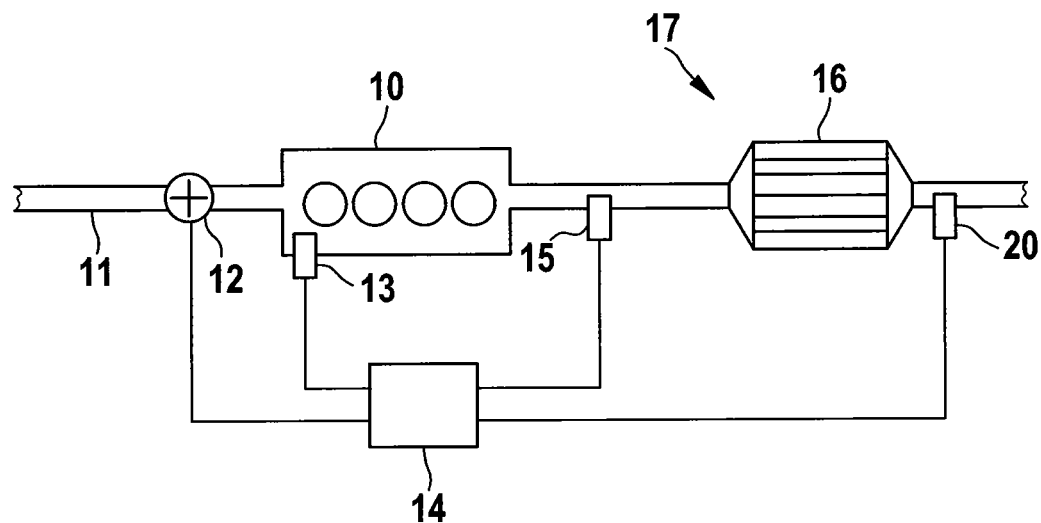
FIG. 1 shows, in a diagrammatic illustration, the technical surroundings, in which the method can be applied, and FIG. 2 diagrammatically shows an exhaust gas probe which is configured as a particle sensor, in an exploded illustration.

FIG. 1 diagrammatically shows the technical surroundings, in which the method according to the invention can be applied. An internal combustion engine 10 which can be configured as a diesel engine is fed combustion air via an air feed means 11. Here, the air quantity of the combustion air can be determined by means of an air mass flow rate meter 12 in the air feed means 11. The air quantity can be used in a correction of an accretion probability of particles present in the exhaust gas of the internal combustion engine 10. The exhaust gas of the internal combustion engine 10 is discharged via an exhaust gas section 17, in which an exhaust gas purification system 16 is arranged. Said exhaust gas purification system 16 can be configured as a diesel particle filter. Furthermore, an exhaust gas probe 15 which is configured as a lambda probe and an exhaust gas probe 20 which is configured as a particle sensor are arranged in the exhaust gas section 17, the signals of which exhaust gas probes 15, 20 are fed to an engine controller 14. Furthermore, the engine controller 14 is connected to the air mass flow rate meter 12 and, on the basis of the data which are fed to it, determines a fuel quantity which can be fed to the internal combustion engine 10 via a fuel metering means 13.

In the example shown, the particle sensor (exhaust gas probe 20) is arranged behind the exhaust gas purification system 16 in the flow direction of the exhaust gas, which affords advantages with regard to a homogenization of the exhaust gas stream at this point and is the case, in particular, when used in the context of on board diagnosis. By way of the apparatuses shown, an observation of the particle emissions of the internal combustion engine 10 and a prognosis of the loading of the exhaust gas purification system 16 which is configured as a diesel particulate filter (DPF) are possible.

Figure 2:
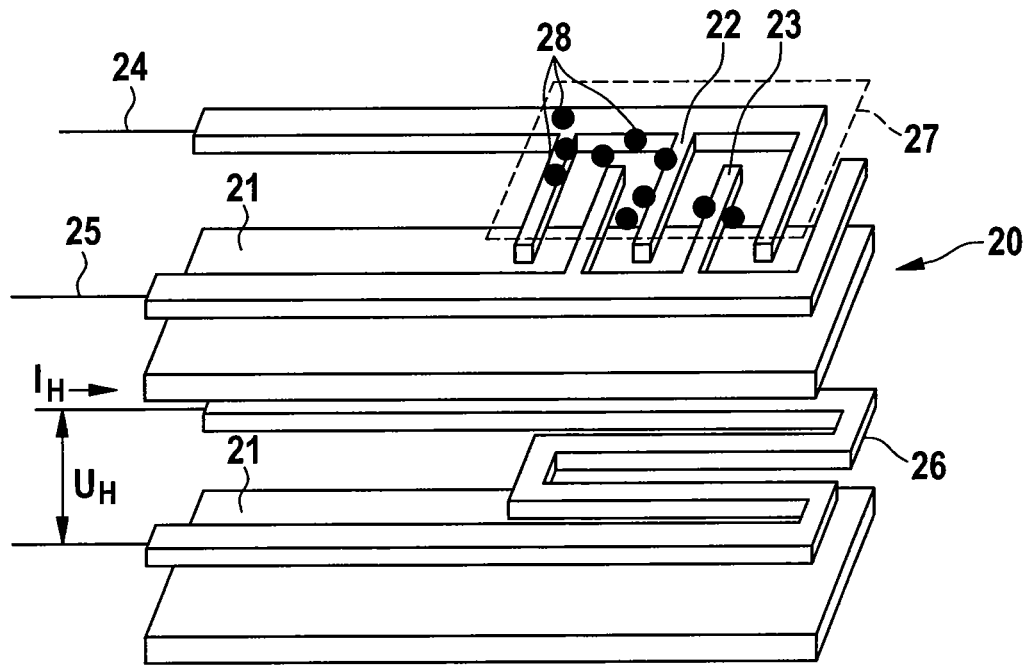

FIG. 2 shows, in a diagrammatic illustration, an exhaust gas probe 20 which is configured as a particle sensor, in accordance with the prior art, in an exploded illustration.

A first electrode 22 and a second electrode 23 are applied on insulating carrier layers 21, for example made from aluminum oxide. The electrodes 22, 23 are configured in the form of two interdigital comb electrodes which engage into one another. A first connection 24 and a second connection 25 are provided at the front-side ends of the electrodes 22, 23, via which connections 24, 25 the electrodes 22, 23 can be connected for voltage supply and for carrying out the measurement with a sensor control unit (not shown). In the exemplary embodiment, the electrodes 22, 23 and the uppermost insulation carrier layer 21, on which the electrodes 22, 23 are situated, are covered with a protective layer 27. This optional protective layer 27 protects the electrodes 22, 23 against corrosion at the usually prevailing high operating temperatures of the particle sensor. In the present exemplary embodiment, said protective layer is produced from a material with a low conductivity, but can also be made from an insulator. In addition, in the example shown, a heating element 26 is integrated between the insulating carrier layers 21, which heating element 26 is connected via additional connections to the sensor control unit and can be loaded at least temporarily with a heating voltage $U_H$, with the result that a heating current $I_H$ can flow. Firstly the heating element 26 itself or a temperature sensor element which is integrated separately into the particle sensor (for example, as a Pt100 resistance track or as an NTC or PTC ceramic sensor element) can be used for the temperature measurement.

If a particle sensor of this type is operated in a gas stream which conducts in a particle 28, for example in an exhaust gas channel of a diesel engine or a combustion plant, particles 28 from the gas stream accrete on the particle sensor. In the case of the diesel engine, the particles 28 are soot particles with a corresponding electric conductivity. Here, the accretion rate of the particles 28 on the particle sensor also depends, in addition to the particle concentration in the exhaust gas, on the voltage, inter alia, which prevails at the electrodes 22, 23. The loading with particles can be determined, for example, by means of a resistance or impedance measurement at the electrodes 22, 23. If the particle sensor is covered with a layer of particles 28 to such an extent that additionally accreted particles 28 do not lead to an additional change in the resistance or the impedance of the particle sensor, the particle sensor is regenerated within a regeneration phase. To this end, the particle sensor is heated with the aid of the heating element 26 to such an extent that the attached particles 28 burn.

Here, the method according to the invention provides in one exemplary embodiment for the absolute electric heat output to be compared with a predicted heat output for the self-diagnosis of the particle filter, the predicted heat output being calculated from the boundary conditions in the exhaust gas section 17 of the internal combustion engine 10. If the two heat outputs do not coincide within predefined limits, a defect of the particle sensor is derived or a faulty condition in the exhaust gas section 17 is deduced.

In one case, a comparison is carried out of the maximum heating voltage $U_H$ which can be demanded and is calculated from an available supply voltage $U_{Bat}$ and a maximum possible heating duty factor $TV_{max}$ according to the relationship $U_H = U_{Bat} * \sqrt{TV_{max}}$. In the case of a setpoint value deviation at excessively low temperatures, this is the variable, with which the heat output $P_H$ can be quantified. A heating voltage which is required under the boundary conditions can be determined from a characteristic curve which is a function of the exhaust gas volumetric flow. If the heating voltage which can be demanded is greater than the required heating voltage, it can be deduced that the heating element 26 is defective.

Here, it can be advantageous with regard to the diagnosis of a possible sensor removal and possible protective pipe blockage also to track the change in the heat output as a reaction to changes in the exhaust gas speed and to detect whether the heat output changes which is necessary to maintain a constant temperature. This is favorable, in particular, when the changes in the exhaust gas speed takes place within a short observation time period, typically <30 s. In this case, effects of changes in the exhaust gas temperature and the tube wall temperature of the particle sensor can be considered to be low, since the stated variables can change only over relatively long time periods.

Here, defect detection can be realized in the following steps. Within a predefined time interval, the minimum and maximum exhaust gas speed $w_{min}$ and $w_{max}$ are determined. The change $\Delta w = w_{max} - w_{min}$ is calculated from this. The associated heat output which is quantified here by an effective heating voltage $U_H$ is likewise detected here and the associated change $\Delta U_H$ is calculated. If the change $\Delta w$ exceeds a predefined threshold, a diagnosis can be carried out. Otherwise, the diagnosis is considered to have not been carried out. Furthermore, it is as a rule necessary not to carry out the diagnosis if the exhaust gas temperature exceeds a predefined threshold value since, in the case of an equalization of exhaust gas temperature and sensor element temperature, no heat output changes are to be expected even in the case of an intact sensor.

The observed heat output change $\Delta U_H$ is subjected to a plausibility check. This can take place, for example, by comparison of the measured ratio $\Delta U_H/\Delta w$ with a predefined threshold value $(\Delta U_H/\Delta w)_{min}$. If the threshold is exceeded, a defect is detected. Here, alternative comparison methods are also conceivable, such as the comparison of the measured heat output change $\Delta U_H$ with a $\Delta w$ dependent characteristic curve $\Delta U_{H,min} = f(\Delta w)$ of threshold values. Here, as already described above, filtered values for $U_H$ and w can be used.

In addition, a widening of the function of the particle sensor is conceivable with a corresponding measuring strategy. Said particle sensor is after all usually equipped with a temperature measuring function. However, the volumetric flow is not detected. It is now known that the thermal coupling of the sensor element to the exhaust gas has a dependence on the volumetric flow. This dependence can be used to deduce the actual volumetric flow as a function of the temperature and the change in the temperature. A model understanding for the protective pipe throughflow as a function of the volumetric flow is necessary for this. Here, the inclusion of an additional temperature signal from a further temperature sensor can be helpful with regard to improved measuring accuracy.

The invention claimed is:

1. An apparatus for the self-diagnosis of an exhaust gas probe (20), the exhaust gas probe (20) having at least one heating element (26) and the exhaust gas probe (20) being connected to a controller, and the controller having devices for the diagnosis of the exhaust gas probe (20), characterized in that the controller has at least one calculating unit for the determination, in a modeled manner, of a parameter which denotes the correct operation of the exhaust gas probe (20), this parameter determined from parameters of the gas stream, and comparing said parameter with a measured parameter by means of at least one evaluation unit which is integrated into the controller, and determining the exhaust gas probe (20) is defective when a deviation exceeds a defined tolerance limit, or determining a faulty condition exists in an exhaust gas section (17), in which the exhaust gas probe (20) is installed.

2. An apparatus according to claim 1, characterized in that the parameter which is defined in a modeled manner, is compared with the measured parameter is the heat output $P_H$ of the heating element (26) of the exhaust gas probe (20).

3. An apparatus according to claim 2, characterized in that the exhaust gas probe (20) is configured as a particle sensor for determining a soot loading in the gas stream.

4. An apparatus according to claim 1, characterized in that the controller is one of an engine controller (14) of an internal combustion engine (10) or a sensor control unit.

5. An apparatus according to claim 1, characterized in that the parameter which denotes correct operation of the exhaust gas probe (20) is determined from boundary conditions of the gas stream or from measured parameters of the gas stream.

6. A method for the self-diagnosis of an exhaust gas probe (20), the exhaust gas probe (20) having at least one heating element (26), characterized in that a modeled heat output $P_H$ is determined for the heating element (26) by means of a computer program comparing parameters of the gas stream with a measured heat output, and determining, when the parameters of the gas stream exceeds the measured heat output by more than a defined tolerance limit, that one of the exhaust gas probe (20) is defective, and an exhaust gas section (17) in which the exhaust gas probe (20) is installed is faulty.

7. A method according to claim 6, characterized by determining the measured heat output $P_H$ from a heating current $I_H$ and a heating voltage $U_H$ applied to the heating element (26).

8. A method according to claim 7, characterized by using the heating voltage $U_H$ as a replacement variable.

9. A method according to claim 7, characterized by determining a heat output from an available supply voltage $U_{Bat}$ and a maximum possible heating duty factor $TV_{max}$, and using the heat output as replacement variable.

10. A method according to claim 6, characterized by detecting, by a temperature measuring device in the exhaust gas probe (20), whether a setpoint temperature has been reached, and determining whether a deviation has been caused as a consequence of unfavorable operating conditions.

11. A method according to claim 6, characterized by determining additional variables beyond the heat output $P_H$ determined in a modeled manner, and using the determined additional variables for a comparison.

12. A method according to claim 6, characterized by subjecting input variables for the measured parameters for the gas stream to a filtering operation, and subsequently processing the input variables further to determine the modeled heat output.

13. A method according to claim 6, characterized by comparing temporal changes of the variables which are determined in a modeled manner with the measured variables or their changes.

14. A method according to claim 6, characterized by comparing an observed change in the heat output with a change in the parameters of the gas stream, and comparing a ratio of the change in the heat output and a change in the parameters of the gas stream with a threshold value.

15. A method according to claim 14, characterized in that the threshold is predefined or is variable based on a function of the parameters or the parameters which define the gas stream.

16. A method according to claim 6, characterized by determining a particle content in the gas stream using, as the exhaust gas probe (20), a particle sensor, and heating the particle sensor by means of the heating element (26) in a regeneration phase to remove a soot loading on the particle sensor.

17. A method according to claim 6, characterized in that the diagnosis is carried out during a phase having a constantly controlled temperature, or during a regeneration of the exhaust gas probe (20) having a heating ramp for achieving a free burning temperature required for soot elimination, or when the measured actual temperature deviates from an expected temperature setpoint value.

18. A method according to claim 6, characterized by determining the parameters of the gas stream from boundary conditions of the gas stream or from measured parameters of the gas stream.

19. A method according to claim 6, characterized in that the measured heat output $P_H$ is determined from a replacement variable.

20. A method for the self-diagnosis of an exhaust gas probe (20), the exhaust gas probe (20) having at least one heating element (26), characterized in that a modeled parameter is determined for the heating element (26) by means of a computer program comparing parameters of the gas stream with the modeled parameter, and determining, when the parameters of the gas stream exceeds the modeled parameter by more than a defined tolerance limit, that one of the exhaust gas probe (20) is defective, and an exhaust gas section (17) in which the exhaust gas probe (20) is installed is faulty.

* * * * *